(12) United States Patent
Restifo (10) Patent No.: US 11,685,452 B2
(45) Date of Patent: *Jun. 27, 2023

(54) TRACKED VEHICLE SHOES

(71) Applicant: Antonino Restifo, High Wycombe (AU)

(72) Inventor: Antonino Restifo, High Wycombe (AU)

(*) Notice: Subject to any disclaimer, the term of this patent is extended or adjusted under 35 U.S.C. 154(b) by 0 days.

This patent is subject to a terminal disclaimer.

(21) Appl. No.: 17/660,765

(22) Filed: Apr. 26, 2022

(65) Prior Publication Data

US 2022/0250697 A1 Aug. 11, 2022

Related U.S. Application Data

(63) Continuation of application No. 16/312,818, filed as application No. PCT/AU2017/050511 on May 30, 2017, now Pat. No. 11,414,143.

(30) Foreign Application Priority Data

Jun. 24, 2016 (AU) ................ 2016902497

(51) Int. Cl.
*B62D 55/20* (2006.01)
*B62D 55/21* (2006.01)
*B62D 55/32* (2006.01)

(52) U.S. Cl.
CPC .......... *B62D 55/202* (2013.01); *B62D 55/21* (2013.01); *B62D 55/32* (2013.01)

(58) Field of Classification Search
CPC ...... B62D 55/18; B62D 55/20; B62D 55/202; B62D 55/21; B62D 55/32
See application file for complete search history.

(56) References Cited

U.S. PATENT DOCUMENTS

| 2,797,967 A | 7/1957 | Irvin |
| 3,053,579 A | 9/1962 | Trudeau |
| 3,307,882 A | 3/1967 | McFayden |
| 3,477,769 A | 11/1969 | Thompson |

(Continued)

FOREIGN PATENT DOCUMENTS

| CN | 104340290 | 2/2015 |
| JP | 2015140157 | 8/2015 |

OTHER PUBLICATIONS

International Application No. PCT/AU2017/050511, International Preliminary Report on Patentability, dated May 29, 2018, 48 pages.

(Continued)

*Primary Examiner* — S. Joseph Morano
*Assistant Examiner* — Emily G. Castonguay
(74) *Attorney, Agent, or Firm* — Kilpatrick Townsend & Stockton LLP (57) ABSTRACT

A track shoe assembly is described that comprises a drive lug part and a track shoe body including a drive lug cavity configured to receive the drive lug part. The drive lug part has at least one lug portion protruding in a first direction, and at least one supporting protrusion extending in a direction substantially opposite to the first direction. The at least one supporting protrusion is configured to be receivable in a drive lug cavity formed in a track shoe such that a load applied to the drive lug part is at least partially transferred to the track shoe.

17 Claims, 7 Drawing Sheets

(56) References Cited

U.S. PATENT DOCUMENTS 11,414,143 B2* 8/2022 Restifo .................. B62D 55/32
2015/0375813 A1 12/2015 Talbot et al.
2018/0215427 A1 8/2018 Sho et al.

OTHER PUBLICATIONS

International Application No. PCT/AU2017/050511, International Search Report and Written Opinion, dated Jun. 30, 2017, 11 pages.

* cited by examiner

TRACKED VEHICLE SHOES

CROSS-REFERENCE TO RELATED APPLICATIONS

This application is a Continuation of U.S. application Ser. No. 16/312,818, filed Dec. 21, 2018, now U.S. Pat. No. 11,414,143, issued Aug. 16, 2022 ("the '143 Patent"), which is a national phase entry under 35 USC § 371 of International Application PCT/AU2017/050511 ("the '511 application"), filed May 30, 2017, and entitled TRACKED VEHICLE SHOES, which claims priority to and benefits of Australian Patent Application No. 2016902497 ("the '497 application"), filed on Jun. 24, 2016, and entitled TRACKED VEHICLE SHOES. The '511 application, the '143 Patent, and the '497 application are hereby incorporated in their entireties by this reference.

FIELD OF THE INVENTION

The present invention relates to a track shoe assembly for tracked or crawler type vehicles and to a method of constructing a track shoe assembly.

BACKGROUND OF THE INVENTION

There are many types of tracked vehicles, including mining shovels, bulldozers and excavators which typically use a continuous track on each side of the vehicle to spread the weight of the vehicle and thereby decrease ground pressure, and to improve traction. Each track comprises multiple shoes that are interconnected to form the continuous track. The shoes typically have drive lugs facing inwardly of the continuous track to enable drive to be transmitted from drive wheels of the vehicle to the track. Typically, loads and wear of the shoes in a region at and around the drive lugs is typically high, and consequently this region of the shoe often requires maintenance or replacement. Another region of a shoe that tends to wear significantly is at each connector protrusion, specifically at a hole in the connector protrusion through which a pin is passed to link a track shoe to an adjacent track shoe.

Australian patent number 2014100032 seeks to provide a replacement drive lug/pad assembly. The drive lug and pads are formed as a single part. A track shoe has an existing drive lug and associated pads that are cut off and a replacement drive lug and pads welded to a track shoe body. However the drive lug/pad assembly is prone to failure, even when the pads are welded through slots to a vertical brace in the track shoe. Australian patent number 2014100032 also provides for the use of bushings in holes in the connector protrusions that can be replaced when worn.

SUMMARY OF THE INVENTION

A drive lug part for a track shoe is disclosed, the drive lug part comprising:
 at least one lug portion protruding in a first direction; and
 at least one supporting protrusion extending in a direction substantially opposite to the first direction;
 the at least one supporting protrusion configured to be receivable in a drive lug cavity formed in a track shoe such that a load applied to the drive lug part is at least partially transferred to the track shoe body.

In an embodiment, the drive lug part comprises at least one pad portion disposed between the at least one lug portion and the at least one supporting protrusion.

In an embodiment, the drive lug part comprises one supporting protrusion. The supporting protrusion may include a protrusion surface at an end of the supporting protrusion remote from the lug portion.

In an alternative embodiment, the drive lug part comprises a plurality of supporting protrusions.

In an embodiment, the drive lug part comprises at least one void arranged to define the plurality of supporting protrusions.

In an embodiment, the drive lug part comprises a lug part chamfer formed on the drive lug part such that when the drive lug part is received in the drive lug cavity, a channel is defined between the drive lug part and the drive lug cavity for receiving a weld.

In an embodiment, the at least one supporting protrusion comprises at least one recess portion for receiving a load sharing member when the drive lug is received in the drive lug cavity.

Also disclosed is a track shoe assembly comprising:
 a drive lug part according to the first aspect, and
 a track shoe body, the track shoe body including a drive lug cavity configured to receive the drive lug part such that a load applied to the drive lug part is at least partially transferred to the track shoe body.

In an embodiment, the track shoe body comprises a first face for engaging with the ground during use, and a second face opposite to the first face, the drive lug cavity extending inwardly of the second face.

In an embodiment, the drive lug cavity is a blind hole having a blind hole surface, the protrusion surface contacting the blind hole surface when the drive lug part is received in the drive lug cavity. The blind hole surface may form a surface of a wall on the first face of the track shoe body.

In an embodiment, the track shoe body includes:
 at least one hole extending through the wall on the first face of the track shoe body; and
 at least one weld at or adjacent the at least one hole between the supporting protrusion surface and the track shoe body.

In an embodiment, a penetration depth of the drive lug part in the drive lug cavity is at least fifty percent of a height of the track shoe body.

In an embodiment, the track shoe body includes at least one bracing wall extending through the drive lug cavity.

In an embodiment, the supporting protrusions are defined by at least one void, the shapes of the supporting protrusions and the at least one void being complimentary with the shape of the at least one bracing wall such that a load applied to the drive lug part is at least partially transferred to the track shoe body by contact between the supporting protrusions and the at least one bracing wall.

In an embodiment, the track shoe body includes a load sharing through-hole extending into the drive lug cavity, and the track shoe assembly includes a load sharing member receivable through the load sharing through-hole and in the at least one recess in the at least one supporting protrusion such that a load applied to the drive lug part is at least partially transferred to the track shoe body through the at least one load sharing member. The load sharing member may be a load sharing beam.

Also disclosed is a track shoe body including a drive lug cavity configured to receive the drive lug part such that when the drive lug part is received in the drive lug cavity a load applied to the drive lug part is at least partially transferred to the track shoe.

In an embodiment, the track shoe body comprises a first face for engaging with the ground during use, and a second face opposite to the first face, the drive lug cavity extending inwardly of the second face.

In an embodiment, the drive lug cavity is a blind hole having a blind hole surface. The blind hole surface may form a surface of a wall on the first face of the track shoe body.

In an embodiment, the track shoe body includes at least one hole extending through the wall on the first face of the track shoe body.

In an embodiment, the track shoe body includes at least one bracing wall extending through the drive lug cavity.

In an embodiment, the track shoe body includes a load sharing through-hole extending into the drive lug cavity, the load sharing through-hole arranged to receive a load sharing member.

Also disclosed is a method of constructing a track shoe assembly of a track of a vehicle, the method including:
  providing a drive lug part comprising at least one lug portion protruding in a first direction and at least one supporting protrusion extending in a direction substantially opposite to the first direction;
  providing a track shoe body, the track shoe body including a drive lug cavity configured to receive the drive lug part such that a load applied to the drive lug part is at least partially transferred to the track shoe;
  receiving the drive lug part in the drive lug cavity; and
  forming a weld between the drive lug part and the drive lug cavity.

In an embodiment, the method comprises machining the drive lug cavity in the track shoe body from a second face of the track shoe body.

In an embodiment, the method comprises machining at least one through-hole between the drive lug cavity and first face of the track shoe body.

In an embodiment, the method comprises machining a drive lug cavity chamfer at or adjacent an open edge of the drive lug cavity.

In an embodiment, the drive lug cavity chamfer at least partially defines a channel with the drive lug part when the drive lug part is received in the drive lug cavity, and the step of welding the drive lug part into the drive lug cavity includes filling the channel with weld material.

In an embodiment, the method comprises:
  cutting an existing worn drive lug part from an existing track shoe assembly;
  receiving a non-worn drive lug assembly in the drive lug cavity; and
  forming a weld between the non-worn drive lug part and the drive lug cavity.

In accordance with a first aspect of the present invention, there is provided a track shoe assembly comprising:
  a drive lug part including:
    at least one lug portion protruding in a first direction;
    at least one supporting protrusion extending in a direction substantially opposite to the first direction; and
    at least one pad portion disposed between the at least one lug portion and
  the at least one supporting protrusion;
  and
  a track shoe body, the track shoe body including:
    a drive lug cavity configured to receive the drive lug part such that a load applied to the drive lug part is at least partially transferred to the track shoe, the drive lug cavity having a lower surface;
  wherein the drive lug cavity and the drive lug part are arranged define a channel between the drive lug part and the drive lug cavity for receiving a weld when the drive lug part is received in the drive lug cavity; and
  wherein the least one supporting protrusion contacts the lower surface of the drive lug cavity when the drive lug part is received in the drive lug cavity.

In accordance with a second aspect of the present invention, there is provided a drive lug part for the track shoe assembly according to the first aspect, the drive lug part including:
  at least one lug portion protruding in a first direction;
  at least one supporting protrusion extending in a direction substantially opposite to the first direction; and
  at least one pad portion disposed between the at least one lug portion and the at least one supporting protrusion;
  wherein:
    the drive lug part is receivable in the drive lug cavity such that a load applied to the drive lug part is at least partially transferred to the track shoe, the drive lug cavity having a lower surface;
    the drive lug cavity and the drive lug part define a channel between the drive lug part and the drive lug cavity for receiving a weld when the drive lug part is received in the drive lug cavity; and
    the least one supporting protrusion contacts the lower surface of the drive lug cavity when the drive lug part is received in the drive lug cavity.

In accordance with a third aspect of the present invention, there is provided a method of constructing a track shoe assembly of a track of a vehicle, the method including:
  providing a drive lug part comprising at least one lug portion protruding in a first direction, at least one supporting protrusion extending in a direction substantially opposite to the first direction and at least one pad portion disposed between the at least one lug portion and the at least one supporting protrusion;
  providing a track shoe body, the track shoe body including a drive lug cavity having a lower surface, the drive lug cavity configured to receive the drive lug part such that the supporting protrusion contacts that lower surface of the drive lug cavity and a load applied to the drive lug part is at least partially transferred to the track shoe; and
  receiving the drive lug part in the drive lug cavity;
  wherein the drive lug cavity and the drive lug part are arranged define a channel between the drive lug part and the drive lug cavity for receiving a weld when the drive lug part is received in the drive lug cavity; and
  the method further comprises forming a weld between the drive lug part and the drive lug cavity by filling the channel with weld material.

BRIEF DESCRIPTION OF THE DRAWINGS

It will be convenient to further describe the invention by reference to the accompanying drawings which illustrate preferred aspects of the invention. Other embodiments of the invention are possible and consequently particularity of the accompanying drawings is not to be understood as superseding the generality of the description of the invention.

DESCRIPTION OF AN EMBODIMENT OF THE INVENTION

In the drawings, similar or equivalent features are allocated like or similar reference numerals.

Figure 1:
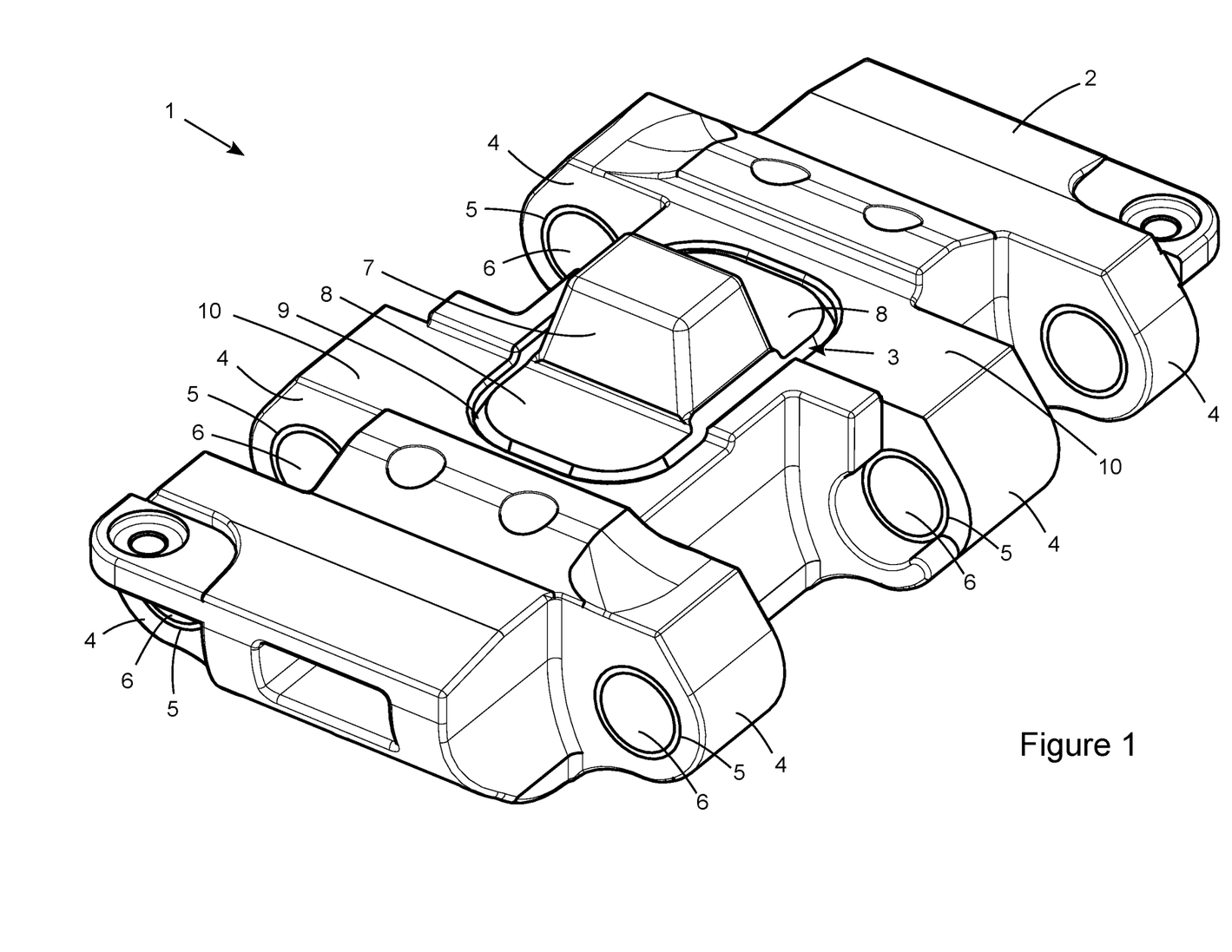
FIG. 1 is a perspective view of a track shoe assembly according to an embodiment of the present invention.

Referring to FIG. 1, there is shown a track shoe assembly 1 having a track shoe body 2 and a replaceable drive lug part 3, the track shoe body 2 including six connector protrusions 4, each having a bore 5.

The track shoe assembly 1 also includes a bushing 6 in the bore 5 of each connector protrusion 4.

In use, the track shoe assembly 1 is connected to an adjacent two track shoe assemblies by aligning the bores 5 on a first side of a track shoe body 2 with bores 5 on a second opposite side of an adjacent track shoe body 2, and passing pins (not shown) through the bushings 6 in the aligned bores 5 to provide a connection between the adjacent track shoe assemblies 1.

An alternative to using bushings 6, which need replacing regularly, is to induction harden the bores 5 and dispose the pins directly through the bores 5 without bushings 6.

However, even with induction hardening, the bores 5 can still wear and, accordingly, a variation suitable for track shoes with or without bushings is to build up the bores by welding with manganese steel wire, then machine the bores back to the correct size for use. Although the resulting surface is not induction hardened, the use of manganese steel welding wire ensures that the surface will work-harden. This can provide a cost effective and functional solution that can also be lower cost than using bushings.

Figures 4, 5, 6:
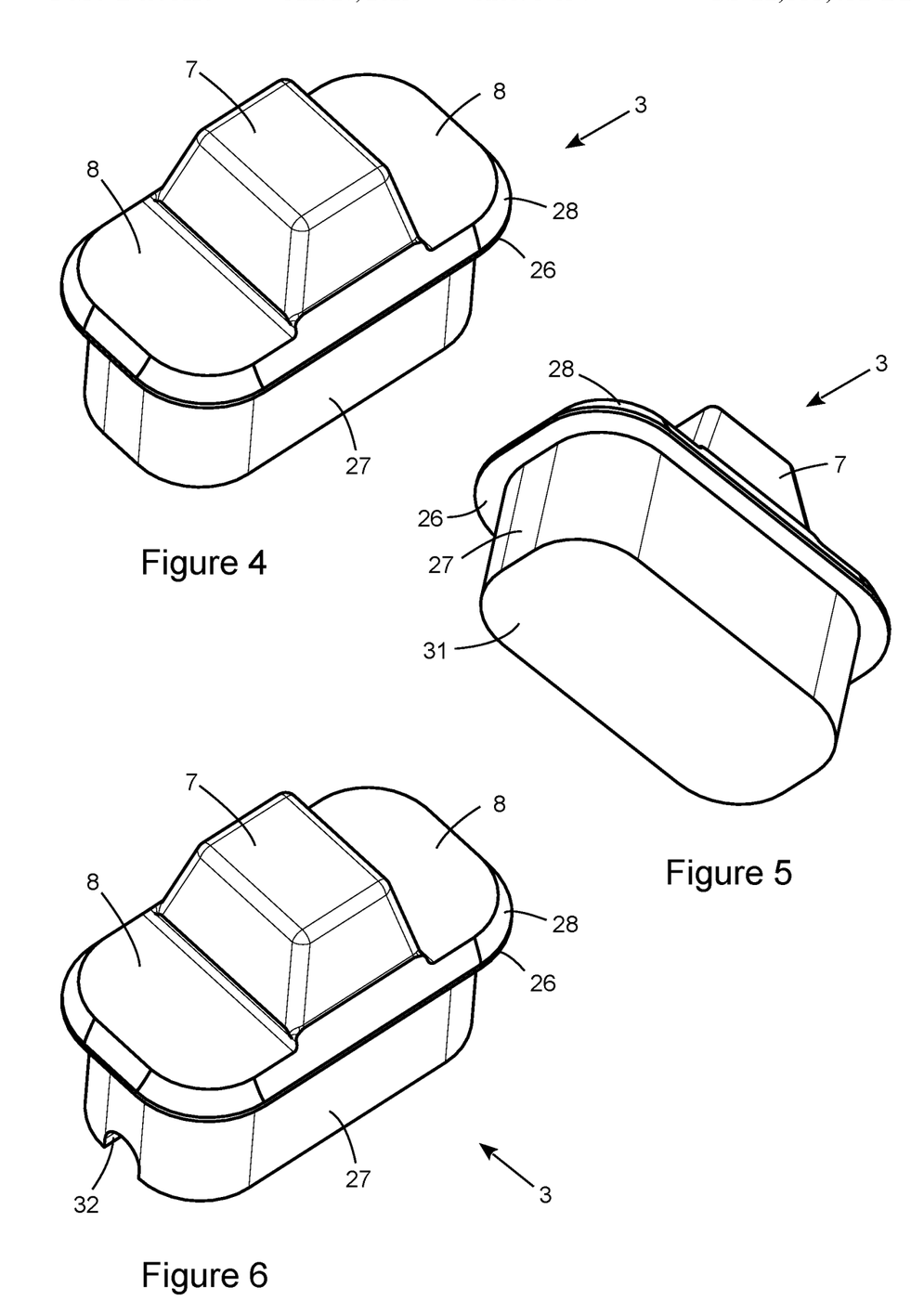
FIG. 4 is an upper perspective view of a drive lug part according to according to an embodiment of the present invention, the drive lug part forming part of the track shoe assembly shown in FIG. 1.
FIG. 5 is a lower perspective view of the drive lug part of FIG. 4.
FIG. 6 is an upper perspective view of a drive lug part according to an alternative embodiment of the present invention.

The drive lug part 3 is shown more particularly in FIGS. 4 and 5, the drive lug part 3 having a lug portion 7, a pad portion 26 and a supporting protrusion 27. The pad portion 26 includes drive lug pads 8. In this example, a lower surface 31 of the supporting protrusion 27 is a single flat surface, as can be seen in FIG. 5. The supporting protrusion surface 31 can be optionally welded to a wall of the track shoe body 2 after the drive lug part 3 is received in the track shoe body 2.

Since the lug portion 7 engages with drive wheels of a tracked vehicle during use, the lug portion 7 and the lug pads 8 adjacent the lug portion 7 are prone to wear, and in particular more wear than the track shoe body 2. Consequently, since the drive lug part 3 is separable from and receivable in the track shoe body 2, when the lug portion 7 and/or the lug pads 8 of a drive lug part 3 become worn, the track shoe assembly 1 can be reconstructed by replacing the worn drive lug part 3 with a new drive lug part 3.

In this example, a channel 9 is defined between the drive lug part 3 and the track shoe body 2. The channel 9 is formed by respective chamfers 28, 17 on the replaceable drive lug part 3 and the track shoe body 2, and is provided to enable good weld penetration and strength. The channel 9 is filled with weld when the drive lug part 3 is received in the track shoe body 2 to securely fix the drive lug part 3 to the track shoe body 2.

During use, it will be understood that in addition to the lug pads 8 on the drive lug part 3, the track shoe body 2 includes track shoe pad surfaces 10, at least part of which can also wear during use. As the track shoe pad surfaces 10 are part of the track shoe body 2, if they become worn to a level below the drive lug pads 8 of a non-worn drive lug portion 3, they can be built up with weld for example. This is acceptable as the drive lug pads 8 on the drive lug part 3 provide the majority of the functional wear pad surface required, for example around seventy percent, although the replaceable portion of the wear pad surface required can vary between sixty and one hundred percent, preferably between sixty and ninety percent of the wear pad surface required.

Figure 2:
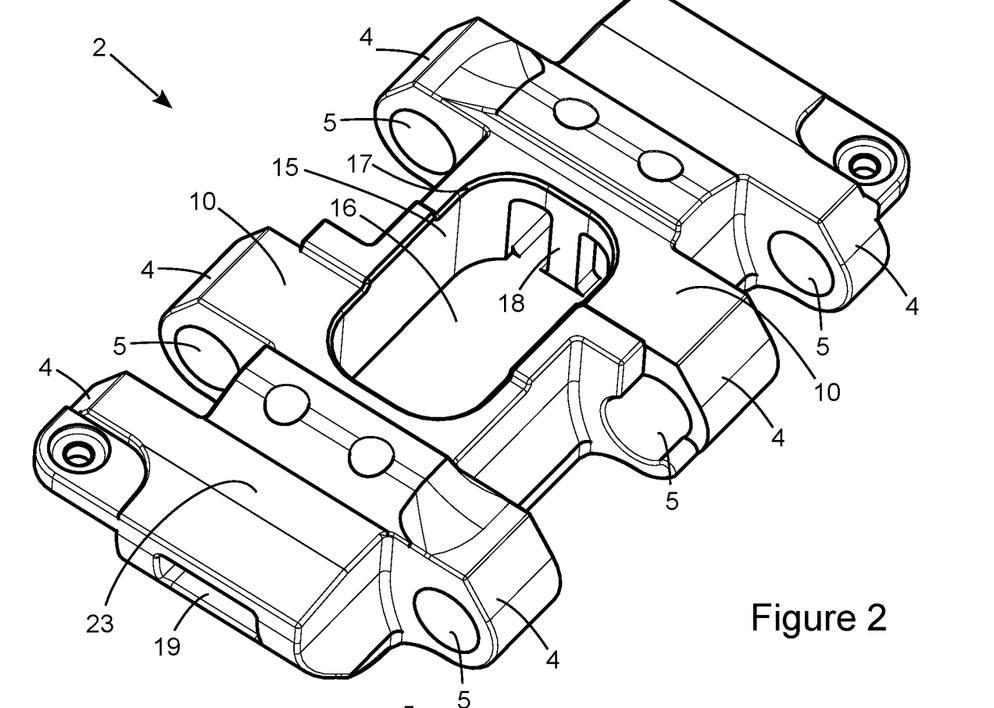
FIG. 2 is an upper perspective view of a track shoe body of the track shoe assembly shown in FIG. 1.
Figure 3:
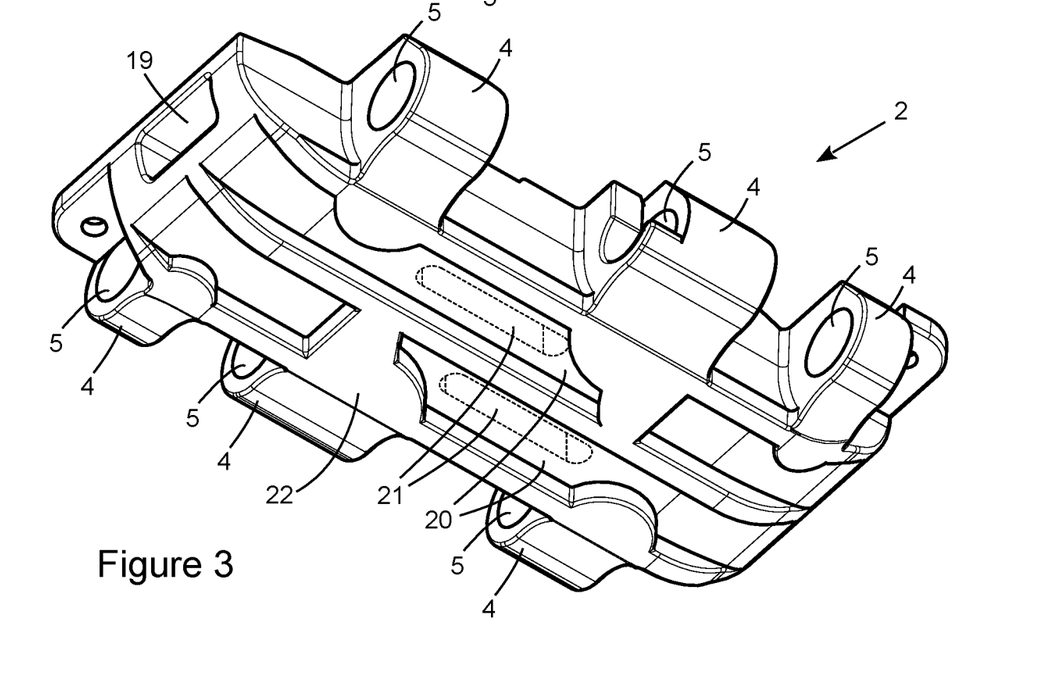
FIG. 3 is a lower perspective view of the track shoe body of FIG. 2.

The track shoe body 2 is shown more particularly in FIGS. 2 and 3. The track shoe body 2 includes a drive lug cavity 15 extending inwardly from an upper side or second face 23 of the track shoe body 2. A chamfer 17 around the drive lug cavity 15 forms at least part of the channel 9 that is filled with weld when the drive lug part 3 is fitted into the track shoe body 2. A bracing wall 18 is disposed at a first end of the drive lug cavity 15, and at an opposite second end of the drive lug cavity 15 at least one through-hole 19 is provided that extends through the track shoe body 2 into the drive lug cavity 15.

In this example, the drive lug cavity 15 is a blind hole having a blind hole surface or lower surface 16 that may be flat. The lower surface 16 of the drive lug cavity 15 forms an upper surface of a wall 20 of a lower side or first face 22 of the track shoe body 2, as shown in FIG. 3. It will be understood that the lower side or first face 22 of the track shoe body is the side or face that contacts the ground in use. Optional through-holes 21, shown in dashed lines, allow a drive lug part 3 received in the drive lug cavity 15 to be welded to the wall 20 of the drive shoe body 2.

Figures 7, 8, 9:
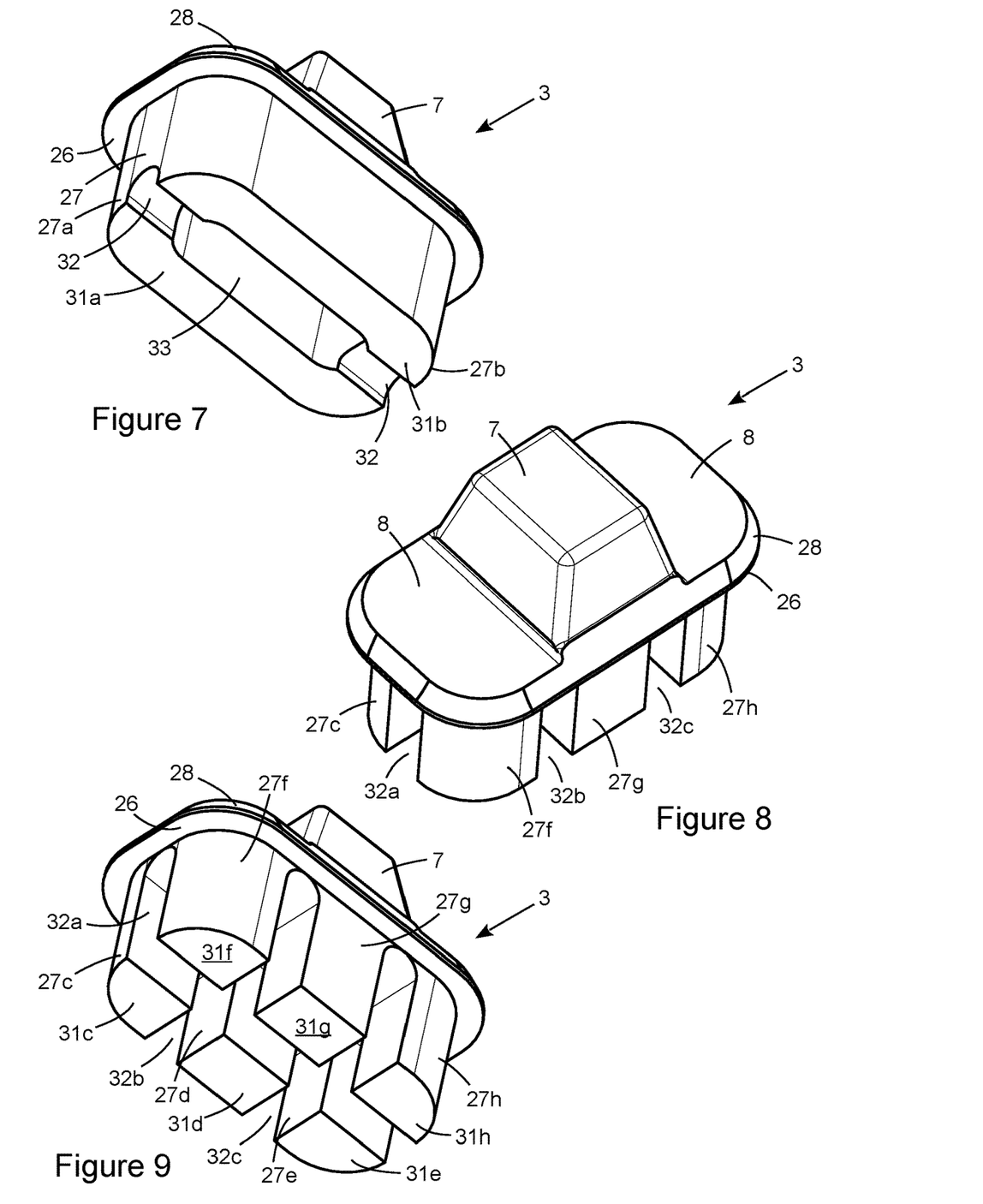
FIG. 7 is a lower perspective view of the drive lug part of FIG. 6.
FIG. 8 is an upper perspective view of a drive lug part according to a further alternative embodiment of the present invention.
FIG. 9 is a lower perspective view of the drive lug part of FIG. 8.

In a variation, the drive lug part 3 is configured with less material than the embodiment shown in FIGS. 4 and 5. For example, as shown in FIG. 6, one or more voids, for example cuts or features provided by a casting mold, may be provided in the lower surface as shown by arched slots 32 and/or a hollowed out portion 33, as shown in FIG. 7. In FIG. 7, the arched slots 32 divide the supporting protrusion 27 into two similar protrusion portions 27a and 27b and also divides the supporting protrusion lower surface into two surface portions i.e. forming two supporting protrusion surfaces 31a and 31b.

FIGS. 8 and 9 show a further alternative drive lug part 3 in which multiple voids extend from the lower surface, in this example in the form of arch-shaped cuts or slots 32a, 32b, 32c, to separate the supporting protrusion 27 into six supporting protrusion portions 27c, 27d, 27e, 27f, 27g, 27h and similarly separating the supporting protrusion lower surface into six surface portions 31c, 31d, 31e, 31f, 31g, 31h.

Figure 10:
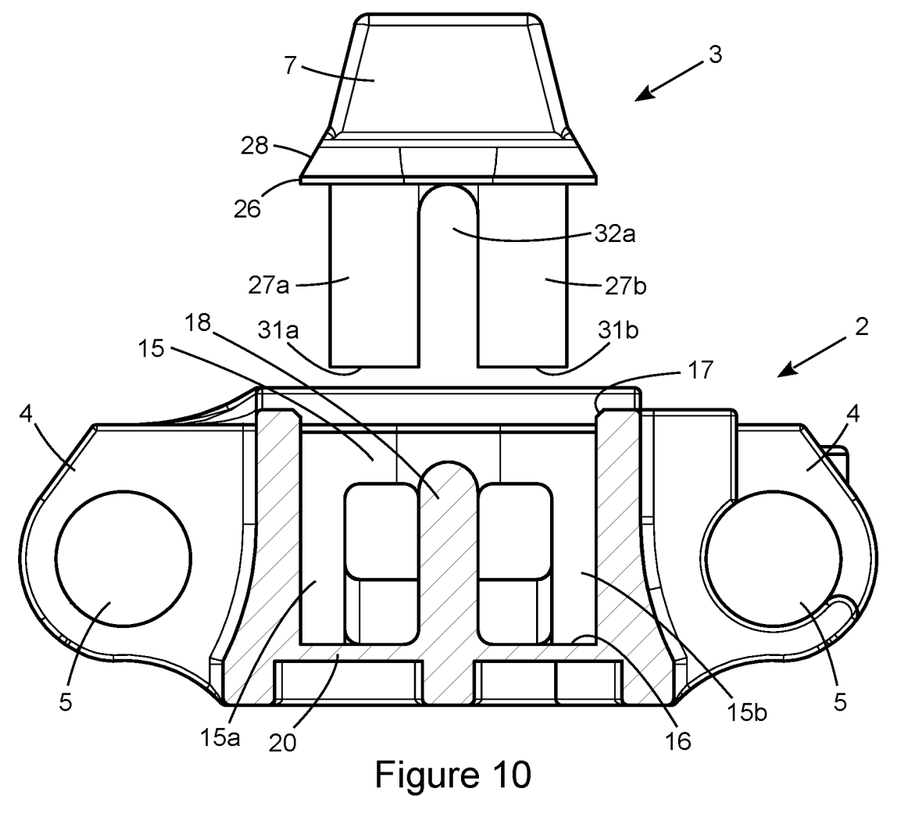
FIG. 10 is a partial cross sectional view of a track shoe assembly according to an embodiment of the present invention, the track shoe assembly including a drive lug part and a track shoe body, with the drive lug part shown prior to engagement with the track shoe body.
Figure 11:
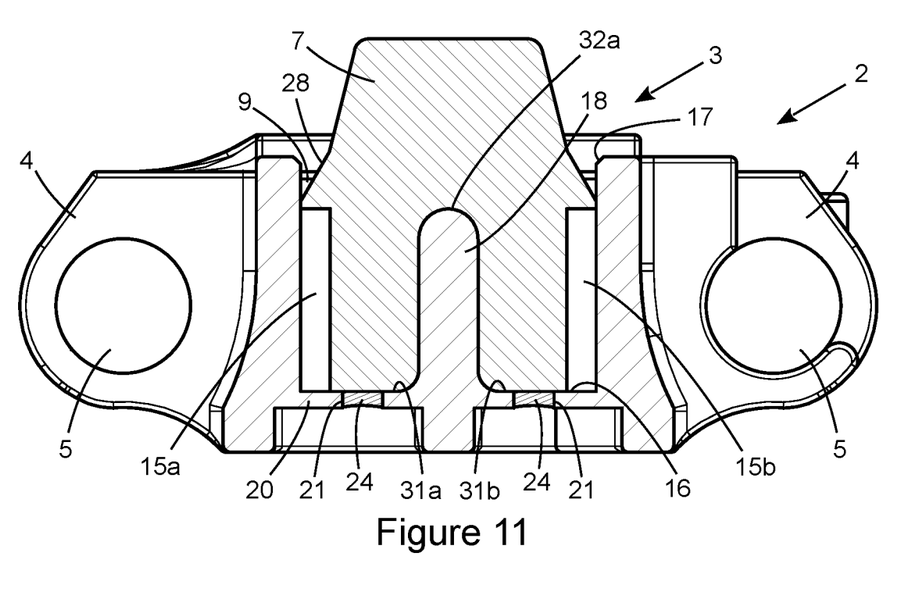
FIG. 11 is a cross-sectional view of the track shoe assembly shown in FIG. 10 with the drive lug part shown engaged with the track shoe body.
Figure 12:
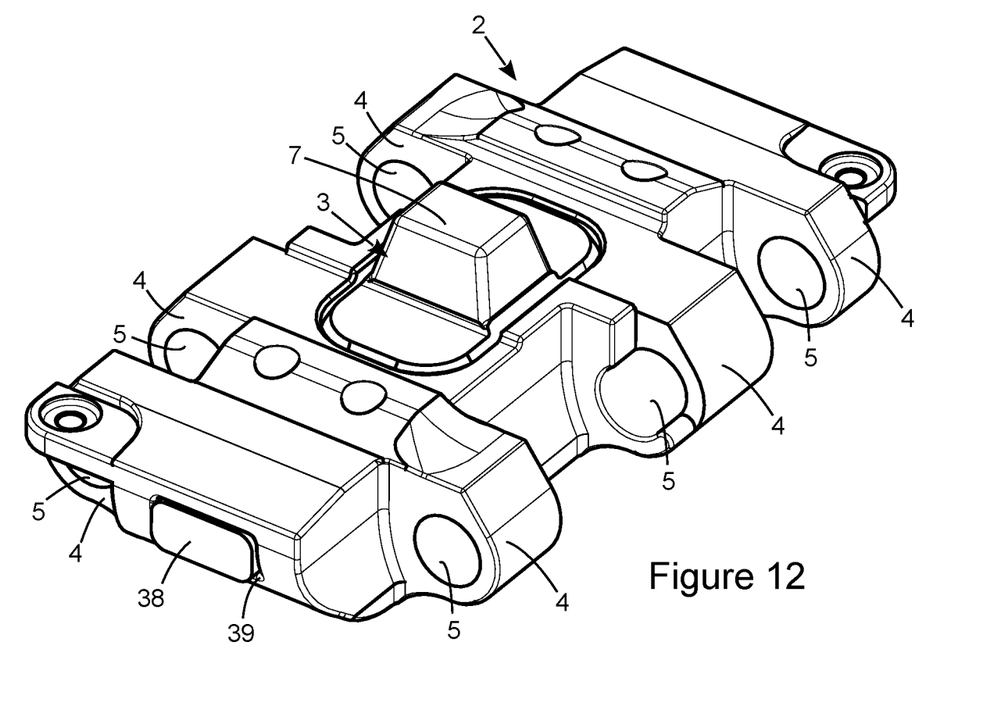
FIG. 12 is a perspective view of a track shoe assembly according to an embodiment of the present invention, the track shoe assembly including a load sharing beam.

As can be seen in FIGS. 10 and 11, providing cuts or slots that extend for part or all of the height of the supporting protrusion enables the drive lug part 3 to be received in a drive lug cavity 15 that includes bracing walls 18 within the track shoe cavity 15. For example, in the track shoe body 2 shown in FIGS. 10 and 11, the bracing wall 18 extends across the entire length of the drive lug cavity 15, dividing it into two cavity portions 15a and 15b to improve the stiffness of the track shoe body 2, and a matching void 32a is formed in the drive lug part 3 to accommodate the bracing wall 18.

However, it will be understood that a drive lug part having one or more supporting protrusions of any suitable configuration and cross-sectional shape is envisaged, the important aspect being that the shape of the supporting protrusion(s) is such that the supporting protrusion(s) is/are receivable in a drive lug cavity of an intended track shoe body and during use loads on the drive lug part are at least partially transferred to the track shoe body by virtue of contact between the supporting protrusion(s) and the track shoe body at the drive lug cavity. For example, a single supporting protrusion may be provided that has an X-shaped cross sectional profile to match a similar X-shaped void defined in the drive lug cavity. Similarly, multiple protrusions of other shapes such as T-section protrusions may be provided. Ideally at the edge where each protrusion intersects the rest of the drive lug part, the intersection has a radius to reduce stress raisers in the drive lug part 3.

Although not shown in FIG. 10, the optional holes 21 shown in dashed lines through the lower wall 20 in FIG. 3 are shown in FIG. 11. Also in FIG. 11, weld 24 in each of the optional holes 21 between the supporting protrusion surface and the track shoe body fixes the surface portions 31a, 31b of the supporting protrusion lower surface of the drive lug part 3 to the drive lug cavity lower surface 16.

As shown more particularly in FIG. 11, in order to enable better weld penetration when the drive lug part 3 is welded to the track shoe body 2, the channel 9 is formed by the chamfer 28 on the drive lug and the chamfer 17 around an open edge of the drive lug cavity 15. In this example, the supporting protrusion lower surfaces 31a and 31b contact the lower surface 16 of the drive lug cavity 15, and in this example the top of the arch 32a in the drive lug part 3 contacts the top of the bracing wall 18 of the track shoe body 2. These points of contact help spread the transfer of loads (applied to the drive lug portion 7 and the drive lug pads 8) into the track shoe body 2 during use, thus minimising peak stresses and improving the strength and durability of the track shoe assembly 1.

FIGS. 12 to 15 show a further modification to enable the loads on the drive lug part 3 to be distributed into the track shoe body 2 at more locations, thereby increasing the surface area over which the loads are input and decreasing stresses in the material of the track shoe body 2. A load sharing member, in this example a load sharing beam 38, is shown engaged in a rectangular through-hole 19, which acts as a load sharing hole, that extends from an outer surface of the track shoe body 2 into the drive lug cavity 15. The load sharing through-hole 19 has a chamfer or radius 39 which can be filled with weld to anchor the load sharing beam 38 into the track shoe body 2.

Figure 13:
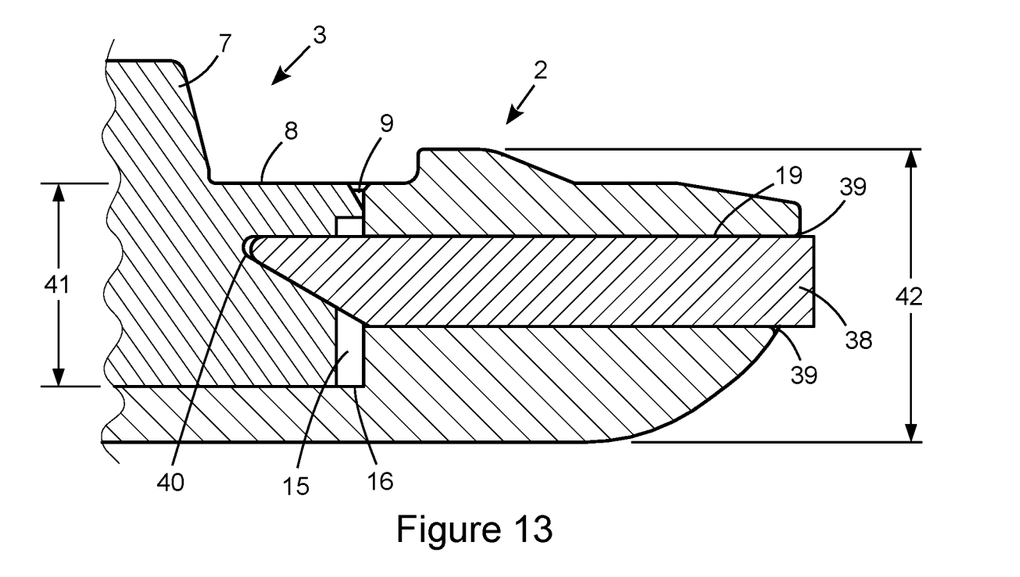
FIG. 13 is a cross-sectional partial view of the track shoe assembly shown in FIG. 12.

The partial cross-section in FIG. 13 shows the load sharing beam 38 inserted into the load sharing through-hole 19 until it engages with a recess, in this example a slot 40, in the drive lug part 3. This enables loads on the drive lug part 3 to be at least partially reacted by the load sharing beam 38.

The depth to which the drive lug part 3 penetrates the track shoe body 2, which corresponds to the depth of the drive lug cavity 15, is indicated by dimension 41 in FIG. 13. In order to provide the maximum opportunities for distributing loads on the drive lug part into the track shoe body during use, the drive lug part penetration depth is between fifty and eighty percent, or more preferably between sixty and seventy-five percent of the total height 42 of the track shoe body.

Figure 14:
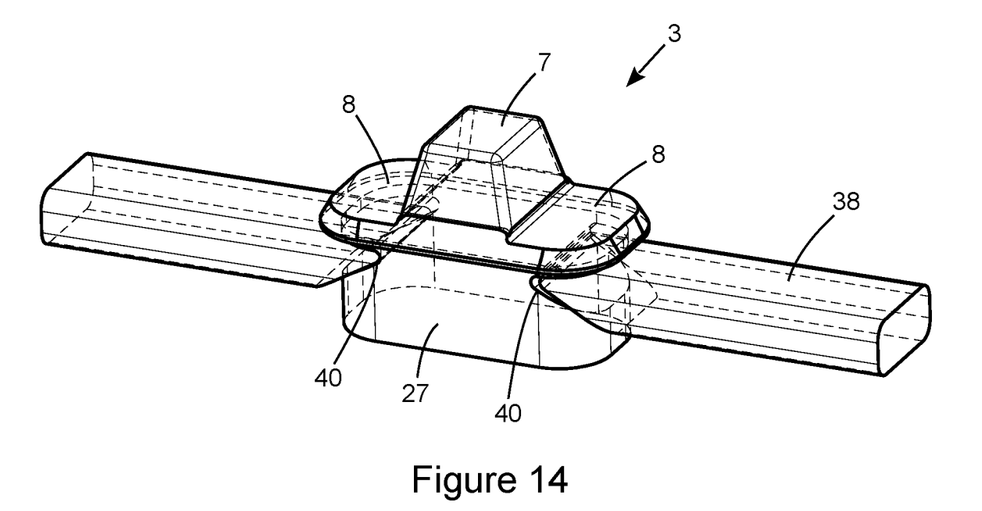
FIGS. 14 and 15 are hidden line views of a drive lug part of the track shoe assembly shown in FIG. 13, the drive lug part shown relative to load sharing beams.
Figure 15:
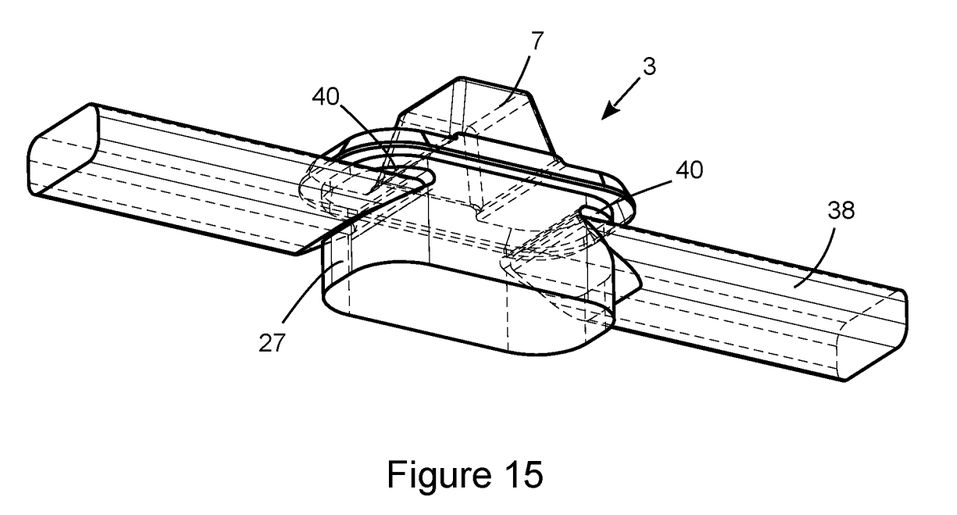

FIGS. 14 and 15 show the drive lug part 3 and the load sharing slots 40 (i.e. recess portions) receiving the ends of the two load sharing beams 38, with hidden lines visible as dashed lines and with the track shoe body hidden for clarity. In this example, the load sharing slots 40 in the drive lug part 3 and the ends of the load sharing beams 38 are both tapered.

It will be understood that the present track shoe assembly has a significantly longer usable life than conventional single-piece track shoes that have a drive lug integral with a track shoe body since with the present track shoe assembly it is possible to reconstruct a track shoe assembly by replacing a worn drive lug with a new drive lug.

It will also be understood that the present track shoe assembly is less prone to failure than conventional two-piece track shoes that have a separate drive lug welded to a track shoe body since with the present track shoe assembly the drive lug is keyed with the track shoe body by virtue of engagement between the supporting protrusion 27 and the drive lug cavity 15.

During use, a track shoe body 2 may be provided that includes a drive lug cavity 15, and in this way a drive lug part 3 can be received in the drive lug cavity 15 and replaced with a new drive lug part 3 when the current drive lug part becomes worn.

After receiving the drive lug part 3 in the drive lug cavity 15, the drive lug part 3 is welded to the track shoe body 2 by welding along the channel 9 defined between the drive lug part 3 and the drive lug cavity 15.

When the drive lug part 3 becomes worn, the worn drive lug part is removed from the track shoe body 2 in any suitable way, for example by oxy or plasma air cutting, and the drive lug cavity 15 cleaned and, if necessary, repaired in order to provide a suitable configuration for reception of a new drive lug part 3 and subsequent welding. The new drive lug part 3 is then disposed in the drive lug cavity 15 and a weld formed along the channel 9 defined between the drive lug part 3 and the drive lug cavity 15.

If necessary, a weld may be formed on the track shoe pad surfaces 10 if the track shoe pad surfaces 10 are worn, and if a weld on the track shoe pad surfaces 10 is required, the track shoe pad surfaces 10 are first prepared, for example by grinding to remove surface material. In addition, if necessary, new bushings 6 may be inserted in the bores 5, or a manganese steel weld formed in the bores 5 then the bores 5 subsequently machined back to the correct size.

As an alternative to providing a track shoe assembly that has a pre-configured track shoe body 2 having a drive lug cavity 15 formed in the track shoe body 2, for example as part of a casting process, the present arrangement may also be applied to an existing track shoe assembly having a track shoe body that is not provided with a drive lug cavity 15. With this type of track shoe assembly, an existing drive lug part can be removed and a drive lug cavity formed by oxy or plasma air cutting for example, so as to thereby form a track shoe body that conforms to the track shoe body 2 of the present track shoe assembly 1, in the sense that the track shoe body is provided with a drive lug cavity 15 that is capable of receiving a replacement drive lug part 3 such that the drive lug part 3 is keyed to the drive lug cavity 15 by virtue of engagement between the supporting protrusion 27 of the drive lug part 3 and the drive lug cavity 15.

In order to facilitate a better weld, a chamfer portion may be formed, for example machined if a chamfer is not present, on the lug pads 8 and/or at an open edge of the drive lug cavity, so that a channel is formed between the drive lug part 3 and the drive lug cavity 15 for receiving a weld.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Modifications and variations as would be apparent to a skilled addressee are deemed to be within the scope of the present invention.

The invention claimed is:

1. A track shoe assembly comprising:
    a drive lug part including:
        at least one lug portion protruding in a first direction;
        at least one supporting protrusion extending in a direction substantially opposite to the first direction; and
        at least one pad portion disposed between the at least one lug portion and the at least one supporting protrusion;
    and
    a track shoe body, the track shoe body including:
        a drive lug cavity configured to receive the drive lug part such that a load applied to the drive lug part is at least partially transferred to the track shoe body;
    wherein the drive lug cavity and the drive lug part are arranged to define a channel between the drive lug part and the drive lug cavity for receiving a weld when the drive lug part is received in the drive lug cavity; and
    the drive lug cavity having a lower surface wherein the least one supporting protrusion contacts the lower surface of the drive lug cavity when the drive lug part is received in the drive lug cavity.

2. The track shoe assembly as claimed in claim 1, wherein at least one supporting protrusion includes a protrusion surface at an end of the supporting protrusion remote from the at least one lug portion, the protrusion surface contacting the lower surface of the drive lug cavity when the drive lug part is received in the drive lug cavity.

3. The track shoe assembly as claimed in claim 2, wherein the track shoe body comprises a first face for engaging with the ground during use, and a second face opposite to the first face, the drive lug cavity extending inwardly of the second face.

4. The track shoe assembly as claimed in claim 3, wherein the lower surface is a surface of a wall on the first face of the track shoe body.

5. The track shoe assembly as claimed in claim 4, wherein the track shoe body includes:
    at least one hole extending through the wall on the first face of the track shoe body; and
    at least one additional weld at or adjacent the at least one hole between the supporting protrusion surface and the track shoe body.

6. The track shoe assembly of claim 2, wherein the drive lug cavity is a blind hole and the lower surface is a blind hole surface, the protrusion surface contacting the blind hole surface when the drive lug part is received in the drive lug cavity.

7. The track shoe assembly of claim 1, wherein the drive lug part comprises one supporting protrusion.

8. The track shoe assembly of claim 1, comprising a plurality of supporting protrusions.

9. The track shoe assembly as claimed in claim 8, comprising at least one void in the lug part arranged to define the plurality of supporting protrusions.

10. The track shoe assembly as claimed in claim 9, wherein the track shoe body includes at least one bracing wall extending through the drive lug cavity.

11. The track shoe assembly as claimed in claim 10, wherein the shapes of the supporting protrusions and the at least one void are complementary with the shape of the at least one bracing wall such that a load applied to the drive lug part is at least partially transferred to the track shoe body by contact between the supporting protrusions and the at least one bracing wall.

12. The track shoe assembly of claim 1, comprising a lug part chamfer on the drive lug part such that when the drive lug part is received in the drive lug cavity, the channel between the drive lug part and the drive lug cavity is at least partially defined by the lug part chamfer.

13. The track shoe assembly of claim 1, comprising a drive lug cavity chamfer at an open edge of the drive lug cavity such that when the drive lug part is received in the drive lug cavity, the channel between the drive lug part and the drive lug cavity is at least partially defined by the drive lug cavity chamfer.

14. The track shoe assembly of claim 1, wherein the at least one supporting protrusion comprises at least one recess portion for receiving a load sharing member when the drive lug is received in the drive lug cavity.

15. The track shoe assembly as claimed in claim 14, wherein the track shoe body includes a load sharing through-hole extending into the drive lug cavity, and the track shoe assembly includes a load sharing member receivable through the load sharing through-hole and in the at least one recess in the at least one supporting protrusion such that a load applied to the drive lug part is at least partially transferred to the track shoe body through the load sharing member.

16. The track shoe assembly as claimed in claim 15, wherein the load sharing member is a load sharing beam.

17. The track shoe assembly of claim 1, wherein a penetration depth of the drive lug part in the drive lug cavity is at least fifty percent of a height of the track shoe body.

* * * * *